United States Patent
Rhee (10) Patent No.: US 8,051,238 B2
(45) Date of Patent: Nov. 1, 2011

(54) ON-CHIP BUS ARCHITECTURES WITH INTERCONNECTED SWITCH POINTS, SEMICONDUCTOR DEVICES USING THE SAME AND METHODS FOR COMMUNICATING DATA IN AN ON-CHIP BUS ARCHITECTURE

(75) Inventor: Chae-Eun Rhee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1476 days.

(21) Appl. No.: 11/244,482

(22) Filed: Oct. 6, 2005

(65) Prior Publication Data

US 2006/0077914 A1 Apr. 13, 2006

(30) Foreign Application Priority Data

Oct. 7, 2004 (KR) .................. 10-2004-0080009

(51) Int. Cl.
*G06F 13/00* (2006.01)
*H04L 12/28* (2006.01)
(52) U.S. Cl. ........ 710/316; 710/300; 710/305; 710/317; 370/254; 370/255; 370/258; 370/406; 370/414
(58) Field of Classification Search .................. 710/316, 710/317; 370/406, 414
See application file for complete search history.

(56) References Cited

U.S. PATENT DOCUMENTS

| | | | | |
|---|---|---|---|---|
| 5,908,468 A | * | 6/1999 | Hartmann | 710/316 |
| 5,923,339 A | * | 7/1999 | Date et al. | 345/505 |
| 6,018,782 A | * | 1/2000 | Hartmann | 710/310 |
| 6,111,859 A | * | 8/2000 | Godfrey et al. | 370/257 |
| 6,266,797 B1 | * | 7/2001 | Godfrey et al. | 716/1 |
| 6,275,975 B1 | * | 8/2001 | Lambrecht et al. | 716/14 |
| 6,549,954 B1 | * | 4/2003 | Lambrecht et al. | 719/315 |
| 6,853,641 B2 | * | 2/2005 | Lindhorst-Ko et al. | 370/394 |
| 7,039,740 B2 | * | 5/2006 | Glasco et al. | 710/266 |
| 7,096,310 B2 | * | 8/2006 | Norden | 710/317 |
| 2002/0176402 A1 | * | 11/2002 | Karim | 370/352 |
| 2005/0185642 A1 | * | 8/2005 | Rhim et al. | 370/389 |
| 2005/0271054 A1 | * | 12/2005 | Kang et al. | 370/389 |
| 2006/0150138 A1 | * | 7/2006 | Rhee | 716/14 |
| 2006/0161875 A1 | * | 7/2006 | Rhee | 716/14 |
| 2006/0268909 A1 | * | 11/2006 | Langevin et al. | 370/405 |

FOREIGN PATENT DOCUMENTS

KR  10-2003-0061609  7/2003

OTHER PUBLICATIONS

Notice to Submit a Response for Korean Patent Application No. 10-2004-0080009 mailed on Mar. 13, 2006.

* cited by examiner

*Primary Examiner* — Brian Misiura
(74) *Attorney, Agent, or Firm* — Myers Bigel Sibley & Sajovec (57) ABSTRACT

An on-chip bus includes a plurality of switch points including first and second switch points, a plurality of inter-switch links including at least one inter-switch link coupled between the first switch point and the second switch point and configured to communicate data between the first switch point and the second switch point, and a plurality of functional block cores including first and second functional block cores coupled directly to the first switch point and configured to communicate data through the first switch point. Data transmitted from the first functional block core to the second functional block cores may pass through the first switch point without traversing any of the plurality of inter-switch links. Methods for communicating data on an on-chip bus are also disclosed.

26 Claims, 5 Drawing Sheets

ON-CHIP BUS ARCHITECTURES WITH INTERCONNECTED SWITCH POINTS, SEMICONDUCTOR DEVICES USING THE SAME AND METHODS FOR COMMUNICATING DATA IN AN ON-CHIP BUS ARCHITECTURE

CROSS REFERENCE TO RELATED APPLICATION

This application claims priority to Korean Patent Application No. 10-2004-0080009 filed on Oct. 7, 2004, the contents of which are herein incorporated by reference in their entirety.

FIELD OF THE INVENTION

The present invention relates to an on-chip bus architecture of a system-on-chip (SOC) system, and more particularly to a mesh-based on-chip bus architecture, a semiconductor device using a mesh-based on-chip bus architecture, and methods for communicating data in an on-chip bus architecture.

BACKGROUND

In the chipset design concept, a computing system may include a set of related functional chips that are designed and produced to be used together. In contrast, chipset technology has recently progressed toward a system-on-chip (SOC) concept in which various functional blocks, previously provided on related individual chips, are integrated onto a single semiconductor chip.

The SOC concept integrates various functional block cores such as, for example, a microprocessor, an on-chip memory, an audio controller, a video controller, a coder and decoder (codec), and/or a digital signal processor (DSP), on a single chip, thereby potentially reducing the total product size, time, and/or cost required for developing a system including the functional block cores.

A functional block core used in an SOC system can be developed independently or can be provided by a core that has been already developed. This reusability of functional block cores may save development time and/or cost.

For data-intensive applications such as the processing of broadband video and/or audio, it may be desirable to provide a large bandwidth for data communication between some of the functional block cores. Accordingly, the expected data traffic load between functional block cores may increase.

For example, in the case of an SOC system in which a large-capacity on-chip memory or a controller (or codec) for processing audio/video signals is built, a large development effort may be required to enable a sufficient level of data communication between functional block cores.

Generally, a bus is used for transferring data between many chips. For example, in an embedded system using an Advanced RISC Machine (ARM) CPU, functional units such as a CPU, a memory controller, and/or a display controller may be connected by a bus architecture such as an Advanced Microcontroller Bus Architecture (AMBA).

In some cases, the functional block cores in an SOC system may be connected by the AMBA bus architecture. For example, in the case of a conventional low-integrated SOC system, a chip-level bus architecture may be used without significant alteration.

However, in a highly integrated SOC system, the width of wires in the system bus may be narrowed. Accordingly, the inductance, resistance and capacitance of the bus wires may be increased in comparison with the size of gates in the functional block core. Consequently, when a conventional bus architecture is used in a highly integrated SOC system, it may be difficult to achieve a desired level of system performance.

Accordingly, interest has developed in a Network-On-Chip (NOC) concept including an efficient on-chip bus architecture corresponding to the SOC concept and associated design methodology. Various on-chip bus architectures have recently been proposed.

Figure 1:
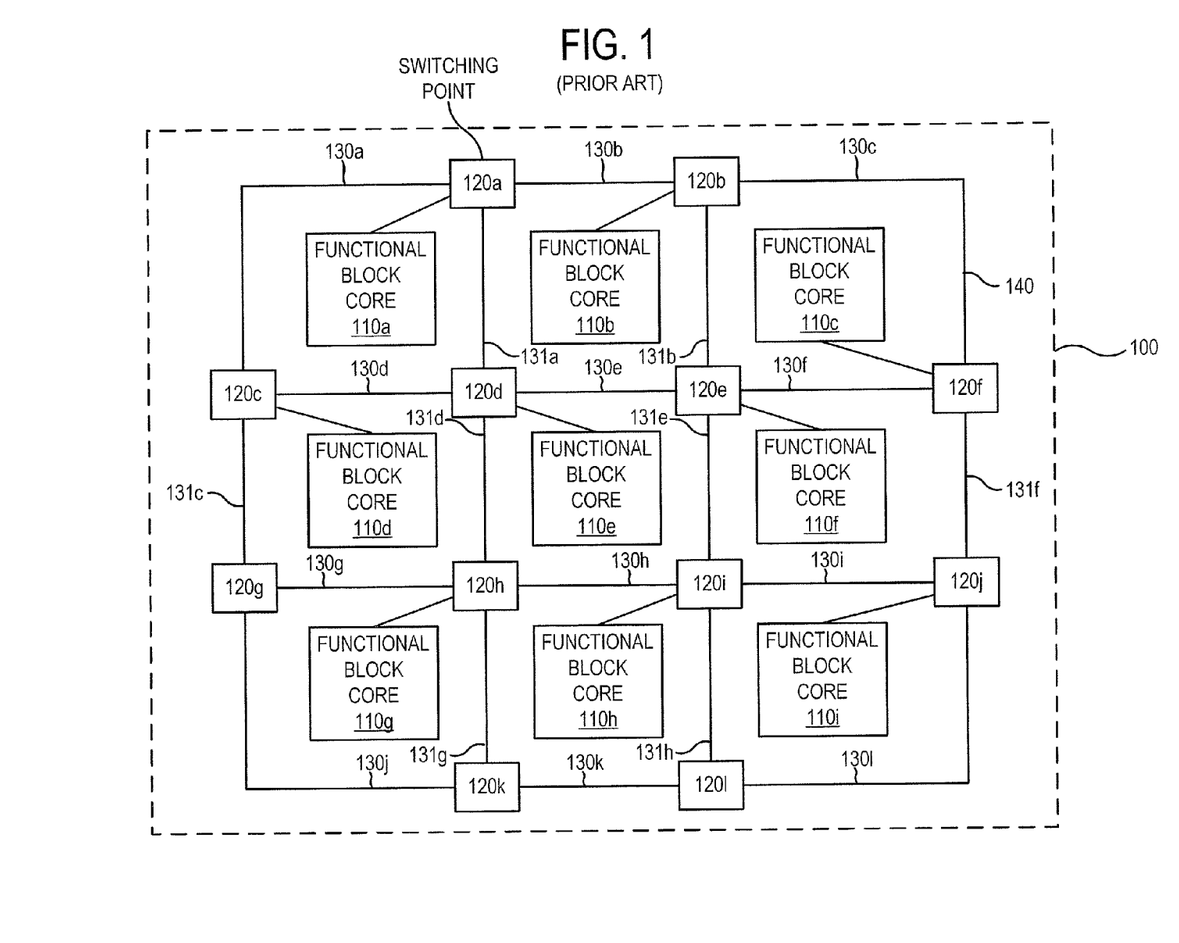
FIG. 1 is a block diagram of a conventional on-chip bus architecture.

A conventional on-chip bus architecture 100 is illustrated in FIG. 1. The architecture 100 is a type of bus architecture usable in an SOC architecture including nine functional block cores 110a-110i, and is a slight modification of a bus structure disclosed in U.S. Pat. No. 5,974,487.

Referring to FIG. 1, a conventional on-chip bus architecture 100 includes nine functional block cores 110a-110i configured to perform various functions, switch points 120a-120l operable to mediate (or relay) data communication between the functional blocks cores 110a-110i, and inter-switch links 130a-130l and 131a-131h interconnecting the switch points 120a-120l.

The inter-switch links 130a-130l, 131a-131h and the switch points 120a-120l are configured in a two-dimensional mesh 140 of rings within the overall bus architecture 100.

The switch points 120a-120l are positioned at interconnections of the mesh 140. Each of the switch points 120a-120l receives data from a source switch point through an inter-switch link and transfers the received data to a destination switch point through an appropriate inter-switch link.

Further, each of the switch points 120a-120l may receive data from a source switch point through an inter-switch link and then transfer the received data to a functional block core connected thereto. Each switch point may receive data from a connected functional block core and transfer the received data to a destination functional block core through a corresponding inter-switch link via an appropriate switch point.

Each of the inter-switch links 130a-130l, 131a-131i may be a bi-directional link or a unidirectional link. A bi-directional link may include a pair of uni-directional wires having opposite communication directions or, alternatively, one bi-directional wire.

In the above-described on-chip bus architecture 100, when the functional block core 110a needs to transfer data to the functional block core 110e, the functional block core 110a transfers the data to the switch point 120a connected thereto.

The switch point 120a receives the data from the functional block core 110a and transfers the received data to the switch point 120d through the inter-switch link 131a connected between the switch points 120a and 120d. The switch point 120d receives the data from the switch point 120a through the inter-switch link 131a and finally transfers the received data to the functional block core 110e connected thereto.

That is, in the on-chip bus architecture 100, data communication between functional block cores 110a-110i is performed through the switch points connected respectively to the functional block cores 110a-110i and inter-switch links 130a-130l, 131a-131h that connect the switch points 120a-120l.

Figure 2:
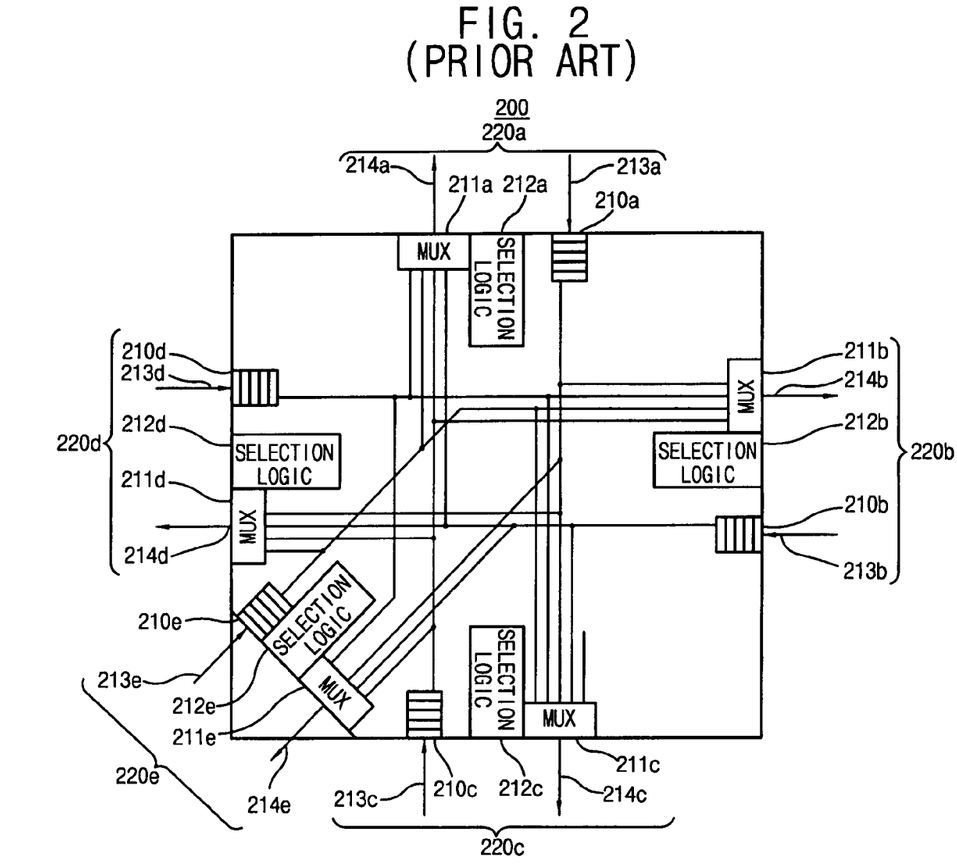
FIG. 2 is a block diagram of a conventional switch point used in the mesh-based on-chip bus architecture illustrated in FIG. 1.

FIG. 2 is a block diagram of a conventional switch point 200 used in the mesh-based on-chip bus architecture 100, which is disclosed in "A Network on Chip Architecture and Design Methodology", Proc. ISVLSI 02, April 2002.

Referring to FIG. 2, a conventional switch point 200 includes a plurality of switch ports 220a-220d, which include incoming links 213a-213d, outgoing links 214a-214d, queues 210a-210d for queuing data received through the incoming links 213a-213d, multiplexers (MUXs) 211a-211d for outputting received data over a selected outgoing link 214a-214d, and selection logic units 212a-212d for controlling the multiplexers 211a-211d.

The incoming links 213a-213d and outgoing links 214a-214d together make up bi-directional inter-switch links. That is, the bi-directional inter-switch links include the incoming links 213a-213d for receiving data into the switch point 200 from the outside and the outgoing links 214a-214d for transferring data from the switch point 200 to the outside.

As illustrated in FIG. 1, the switch points 120a-120l are positioned at the interconnection points of the mesh 140. Each of the switch points 120d, 120e, 120h and 120i is connected to four inter-switch links, respectively, while each of the switch points 120a, 120b, 120c, 120f, 120g, 120j, 120k and 120l is connected to three inter-switch links, respectively.

Referring again to FIG. 2, the switch point 200 has a structure corresponding to one of the switch points 120d, 120e, 120h and 120i, each of which is connected to four inter-switch links. In particular, the switch point 200 has a structure corresponding to one of the switch points 120h and 120i, whose left lower end is connected to a functional block core 110g, 110h.

Data received from another switch point through one of the incoming links 213a-213d is inputted to one of the queues 210a-210d, and data outputted from the queue 210a-210d is selected by at least one of the remaining switch ports 220a-220d and is outputted via an outgoing line 214a-214d. In order to perform this mediation function, each switch port 220a-220d of the switch point 200 is provided with a multiplexer 211a-211d for selecting one of the incoming data queues 210a-210d which receives data from the other switch points, and outputs data through an associated inter-switch link.

For example, in order to determine data to be outputted through the outgoing inter-switch link 214d, the multiplexer 211d selects data that is received through one of the remaining three inter-switch links 213a-213c and is queued in one of the queues 210a-210c. The multiplexer 211d is controlled by the selection logic unit 212d.

The switch point 200 further includes a bus interface port 220e connected to an interface of a functional block core (not shown) connected thereto.

The bus interface port 220e includes a queue 210e for queuing data received from the connected functional block core, a multiplexer 211e for selectively transmitting data from the inter-switch links 213a-213d to the functional block core, and a selection logic unit 212e for controlling the multiplexer 211e.

The on-chip bus architecture 100 using the switch point 200 may be advantageous in that it may be modular and easy to extend, and may have a short link length.

However, the on-chip bus architecture 100 may be disadvantageous in that the on-chip bus architecture 100 may have to use an inter-switch link even for data communication between the functional block cores positioned close to each other.

Accordingly, the power consumption and communication delay of the on-chip bus architecture 100 may undesirably increase in proportion to the number of inter-switch links used in the bus architecture 100.

SUMMARY OF THE INVENTION

An on-chip bus according to some embodiments of the invention includes a plurality of switch points including first and second switch points, a plurality of inter-switch links including at least one inter-switch link coupled between the first switch point and the second switch point and configured to communicate data between the first switch point and the second switch point, and a plurality of functional block cores including first and second functional block cores coupled directly to the first switch point and configured to communicate data through the first switch point. Data transmitted from the first functional block core to the second functional block core may pass through the first switch point without traversing any of the plurality of inter-switch links.

An on-chip bus may further include a third functional block core coupled to the second switch point. Data transmitted from the first functional block core to the third functional block core may pass through the first switch point, the at least one inter-switch link between the first switch point and the second switch point, and the second switch point.

A plurality of inter-switch links between adjacent ones of the plurality of switch points may be arranged in a mesh pattern having a plurality of interconnections. Respective ones of the plurality of switch points may be positioned at respective ones of the plurality of interconnections of the inter-switch links.

The data bandwidth between the first and second functional block cores may be larger than the data bandwidth between the first and third functional block cores.

The first switch point may include a queue configured to store data received from the first functional block core and a queue configured to store data received from the at least one inter-switch link. Additionally, the first switch point may include a multiplexer configured to selectively transfer data received from the first functional block core or from the at least one inter-switch link to the second functional block core.

The first switch point may further include at least one switch port coupled to the at least one inter-switch link, a first bus interface port directly coupled to a bus interface port of the first functional block core, and a second bus interface port directly coupled to a bus interface port of the second functional block core. Each of the first and second bus interface ports may include a respective queue configured to receive and store data from a respective functional block core connected thereto, a multiplexer configured to selectively transfer data to the respective functional block core connected thereto, and a selection logic unit configured to control the operations of the multiplexer.

The switch port may include a queue configured to receive and store data from the second switch point, a multiplexer configured to selectively transfer data to the second switch point, and a selection logic unit configured to control the operations of the multiplexer.

The queue of the switch port may be coupled to the respective multiplexers of the first and second bus interface ports, and the queues of each of the respective bus interface ports may be connected to the multiplexer of the switch port.

In particular embodiments, the queue of the first bus interface port in the switch point may be connected to the multiplexer of the second bus interface port in the switch point. Further, the queue of the second bus interface port in the switch point may be connected to the multiplexer of the first bus interface port in the switch point.

Some embodiments of the invention provide a semiconductor device including an on-chip bus having a plurality of switch points including first and second switch points, a plurality of inter-switch links including at least one inter-switch link coupled between the first switch point and the second switch point and configured to communicate data between the first switch point and the second switch point, and a plurality of functional block cores including first and second functional block cores coupled directly to the first switch point and configured to communicate data through the first switch point. Data transmitted from the first functional block core to the second functional block core may pass through the first switch point without traversing any of the plurality of inter-switch links.

An on-chip bus of a semiconductor device according to some embodiments of the invention may further include a third functional block core coupled to the second switch point. Data transmitted from the first functional block core to the third functional block core may pass through the first switch point, the at least one inter-switch link between the first switch point and the second switch point, and the second switch point.

A plurality of inter-switch links between adjacent ones of the plurality of switch points may be arranged in a mesh pattern having a plurality of interconnections. Respective ones of the plurality of switch points may be positioned at respective ones of the plurality of interconnections of the inter-switch links.

The data bandwidth between the first and second functional block cores may be larger than the data bandwidth between the first and third functional block cores.

The first switch point may include a queue configured to store data received from the first functional block core and a queue configured to store data received from the at least one inter-switch link. Additionally, the first switch point may include a multiplexer configured to selectively transfer data received from the first functional block core or from the at least one inter-switch link to the second functional block core.

The first switch point may further include at least one switch port coupled to the at least one inter-switch link, a first bus interface port directly coupled to a bus interface port of the first functional block core, and a second bus interface port directly coupled to a bus interface port of the second functional block core. Each of the first and second bus interface ports may include a respective queue configured to receive and store data from a respective functional block core connected thereto, a multiplexer configured to selectively transfer data to the respective functional block core connected thereto, and a selection logic unit configured to control the operations of the multiplexer.

The switch port may include a queue configured to receive and store data from the second switch point, a multiplexer configured to selectively transfer data to the second switch point, and a selection logic unit configured to control the operations of the multiplexer.

The queue of the switch port may be coupled to the respective multiplexers of the first and second bus interface ports, and the queues of each of the respective bus interface ports may be connected to the multiplexer of the switch port.

In particular embodiments, the queue of the first bus interface port in the switch point may be connected to the multiplexer of the second bus interface port in the switch point. Further, the queue of the second bus interface port in the switch point may be connected to the multiplexer of the first bus interface port in the switch point.

In some embodiments of the invention, at least one of the switch points is coupled to an external circuit.

Furthermore, the first functional block core may include a microprocessor, a digital signal processor, an FPGA (Field-Programmable Gate Array) block, a mixed signal processor, an I/O (Input/Output) controller and/or a memory block.

Methods for communicating data on an on-chip bus according to embodiments of the invention include receiving data from a source functional block core at a first switch point coupled to the source functional block core, determining whether or not a destination functional block core is directly coupled to the first switch point, sending the data to the destination functional block core through the first switch point when the destination functional block core is directly coupled to the first switch point, and sending the data to the destination functional block core through at least one inter-switch link and at least one second switch point arranged between the first switch point and the destination functional block core when the destination functional block core is not directly coupled to the switch point.

The data received from the source functional block core may be queued at the first switch point.

BRIEF DESCRIPTION OF THE DRAWINGS

The above and other advantages of the present invention will become more apparent by describing in detail the example embodiments thereof with reference to the accompanying drawings, in which.

DETAILED DESCRIPTION OF EMBODIMENTS OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising,"

"includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
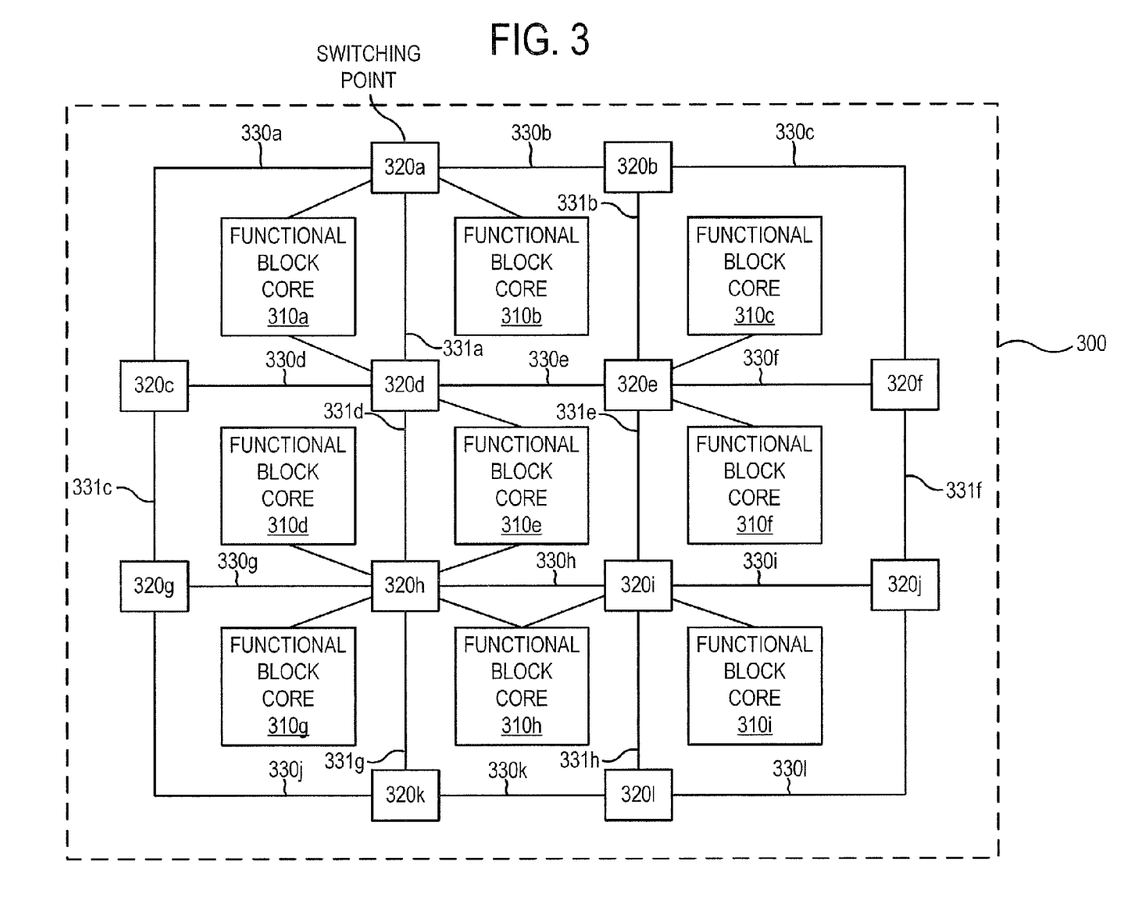
FIG. 3 is a block diagram of an on-chip bus architecture according to some embodiments of the invention.

FIG. 3 is a block diagram of an on-chip bus architecture 300 according to some embodiments of the invention.

Referring to the embodiments of FIG. 3, an on-chip bus architecture 300 includes functional block cores 310a-310i configured to perform various functions, switch points 320a-320l configured to to mediate (or relay) data communication between the functional blocks cores 310a-310i, and inter-switch links 330a-330l and 331a-331h connecting the switch points 320a-320l.

The inter-switch links 330a-330l, 331a-331h and the switch points 320a-320l are configured in a two-dimensional mesh 340 of rings to form an overall layout similar to the layout of the bus architecture 100 described in FIG. 1.

The switch points 320a-320l are positioned at interconnection points of the mesh 340. Each of the switch points 320a-320l receives data from an adjacent switch point through a corresponding inter-switch link and then transfers the received data either to a destination switch point through an appropriate inter-switch link or to a functional block core 310a-310i connected thereto.

That is, each of the switch points 320a-320l may receive data from a source switch point through a corresponding inter-switch link. A switch point 320a-320l may transfer the received data to a functional block core 310a-310i connected thereto. At least some of the switch points 320a-320l may receive data from a connected functional block core 310a-310i and may transfer the received data via an inter-switch link or a series of inter-switch links to a switch point connected to the destination functional block core.

Each of the inter-switch links 330a-330l, 331a-331h may include a bi-directional link and/or a uni-directional link. A bi-directional inter-switch link may include a pair of unidirectional wires having opposite communication directions or alternatively, one bi-directional wire.

In contrast to the conventional on-chip bus architecture 100 illustrated in FIG. 1, in the on-chip bus architecture 300, one switch point 310a-310i of the architecture 300 may be connected directly (that is, without any intervening inter-switch links) to one functional block core or to a plurality of functional block cores. For example, switch point 320a is connected directly to functional block core 310a and functional block core 310b. Likewise, switch point 320h is connected directly to functional block cores 310d, 310e, 310g and 310h.

In contrast to the on-chip bus architecture 100, the on-chip bus architecture 300 is constructed so that a single switch point 320a-320l may be mapped to a plurality of functional block cores 310a-310i.

In the illustrated embodiments, functional block cores 310a-310i having a large level of data traffic may be arranged to share one switch point, so that the inter-switch links 330a-330l, 331a-331h may be used less frequently. Thus, the power consumption and/or communication delays between the functional block cores may be reduced.

In the on-chip bus architecture 300, when the functional block core 310a needs to transfer data to the functional block core 310e, the functional block core 310a may transfer the data to the switch point 320d connected thereto. The switch point 320d may transfer the data directly from the functional block core 310a to the functional block core 310e.

In contrast, in the on-chip bus architecture 100, when the functional block core 110a needs to transfer data to the functional block core 110e, the functional block core 110a transfers the data to the switch point 120a connected thereto. The switch point 120a receives the data from the functional block core 110a and transfers the received data to the switch point 120d through the inter-switch link 131a connected between the switch points 120a and 120d. The switch point 120d receives the data from the switch point 120a through the inter-switch link 131a and finally transfers the received data to the functional block core 110e connected thereto.

Accordingly, in an on-chip bus architecture according to some embodiments of the invention, functional block cores having a large level of data traffic may share a common switch point, so that the inter-switch link usage may be reduced, thereby potentially reducing the power consumption of the circuit and/or communication delays between functional block cores.

The above-described operations of the switch point 320d connected to the two functional block cores 310a and 310e may be extended to switch points connected to three or more functional block cores, such as, for example, the switch point 320h, which is connected to four functional block cores 310d-310h.

For each functional block core 310a-310i connected to a switch point, the switch point may include a bus interface port which is connected to a corresponding bus interface port of the connected functional block core.

As the number of ports at one switch point increases, power consumption by the switch point may increase due to an increase in capacitance caused by an increase in the number of shared lines. However, the power consumption due to increased capacitance may be much smaller than the power consumption that is required for transferring data to a destination functional block core through one or more inter-switch links, as, for example, in the on-chip bus architecture 100.

The reduced inter-switch link usage may effectively result in an increase in the total bandwidth of the network, thereby potentially reducing communication delays between the functional block cores 310a-310i.

Figure 4:
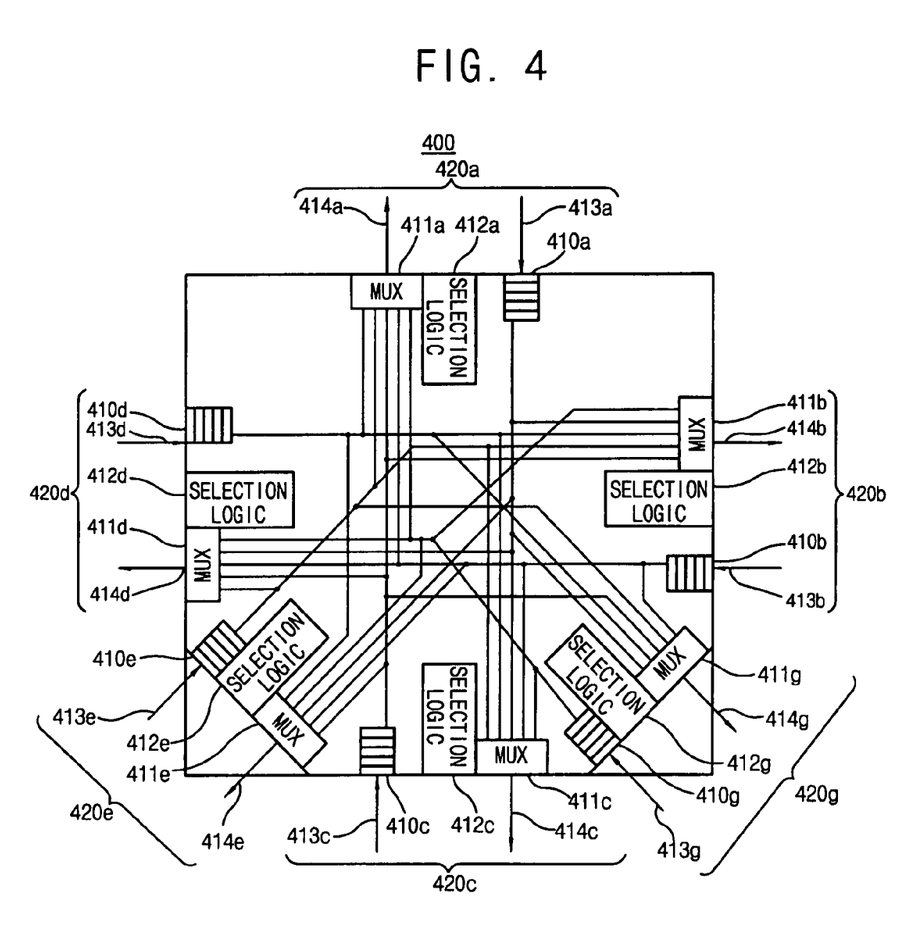
FIG. 4 is a block diagram of a switch point according to some embodiments of the invention.

FIG. 4 is a block diagram of a switch point 400 according to some embodiments of the invention.

Referring to the embodiments of FIG. 4, a switch point 400 may be connected to four inter-switch links via switch ports 420a-420d, which include incoming links 413a-413d and outgoing links 414a-414d. The switch point 400 is also connectable to two functional block cores (not shown) via bus interface ports 420e, 420g which include incoming links 413e, 413g and outgoing links 414e, 414g. That is, the switch point 400 may have a structure corresponding to the switch point 320i of the on-chip bus architecture 300 shown in FIG. 3.

In particular, the switch point 400 may include four switch ports 420a-420d for communicating with adjacent switch points (not shown). The switch ports 420a-420d may also include queues 410a-410d for queuing data received through incoming links 413a-413d, multiplexers (MUXs) 411a-411d configured to selectively transfer data via the outgoing links 414a-414d, and selection logic units 412a-412d configured to control the operation of the multiplexers (MUXs) 411a-411d.

In contrast to the switch point 200 in FIG. 2, the switch point 400 in FIG. 4 has two bus interface ports 420e, 420g which may provide bus interfaces for two functional block cores connected thereto. Each bus interface port 420e, 420g includes an incoming link 413e, 413g coupled to a queue 410e, 410g and an outgoing link 414e, 414g coupled to a multiplexer (MUX) 411e, 411g that is configured to selectively transfer data received via the incoming links 413a-413d or from another functional block core connected to the switch point 400 over an outgoing link 414e, 414g. Selection logic units 412e, 412g are configured to control the operations of the respective associated multiplexers 411e, 411g.

As illustrated in FIG. 4, the two bus interface ports 420e, 420g are connected within the switch point 400 to the four switch ports 420a-420d of the switch point 400, and are also connected to each other.

Accordingly, data communication between functional block cores commonly connected to one switch point may be performed through a direct connection between a bus interface of a functional block core transferring data and a port connected to a bus interface of a functional block core receiving data.

Data communication between functional block cores connected to different switch points in the architecture 300 may be performed in the manner described in connection with the architecture 100 illustrated in FIG. 1.

Figure 5:
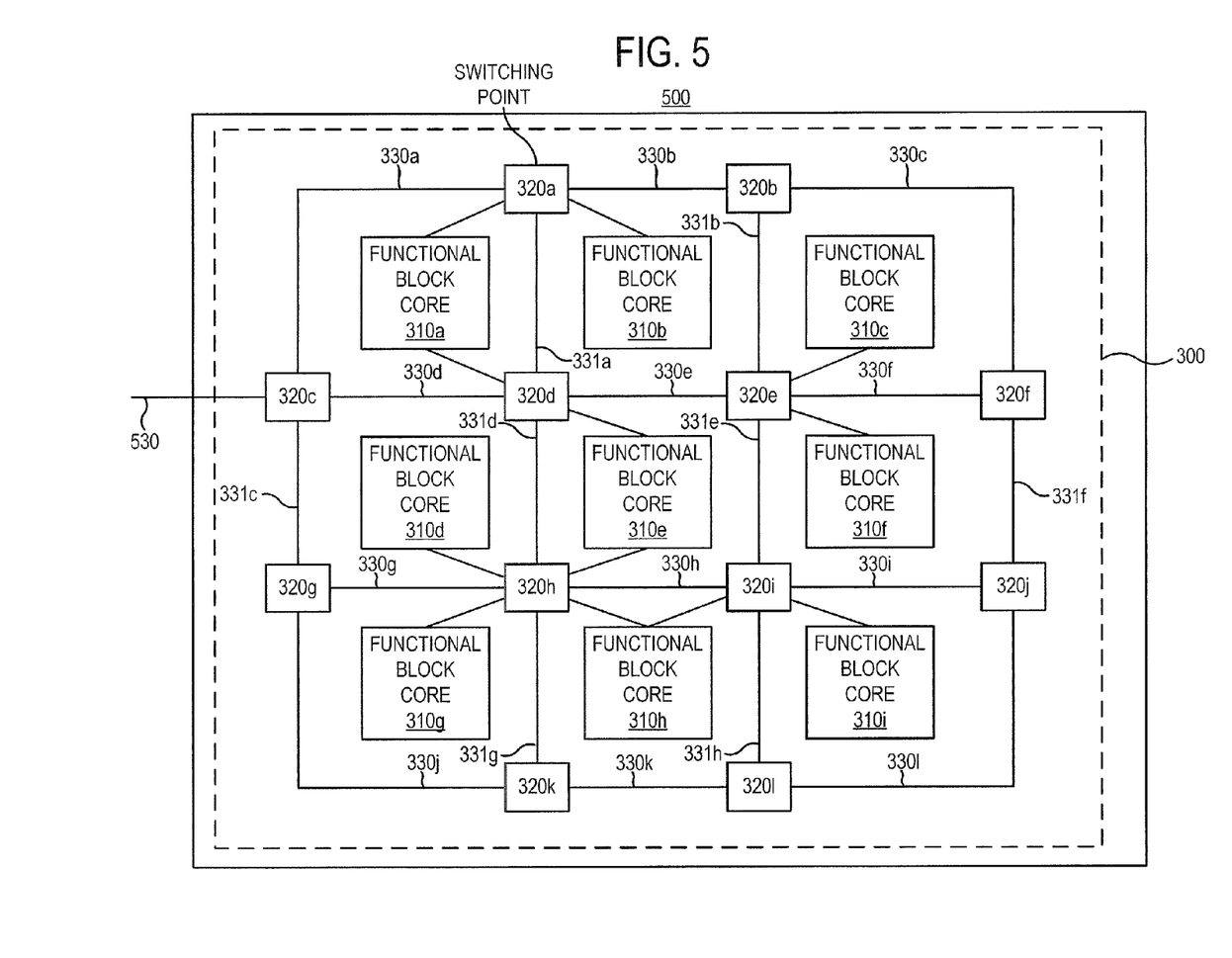
FIG. 5 is a block diagram of a semiconductor device using an on-chip bus architecture according to some embodiments of the invention.

FIG. 5 is a block diagram of a semiconductor device 500 using an on-chip bus architecture 300 according to some embodiments of the invention.

Referring to FIG. 5, a semiconductor device 500 may include an on-chip bus architecture 300 as shown in FIG. 3.

Some of the switch points 320a-320l in the on-chip bus architecture 300 may be connected to an external circuit (not shown) and may communicate data with the external circuit. That is, at least one of the switch points 320a, 320b, 320c, 320f, 320g, 320j, 320k and 320l positioned at an edge of the on-chip bus architecture 300 may be connected to an external circuit.

Alternatively, according to the structure of the semiconductor device 500, at least one of the switch points 320d, 320e, 320h and 320i may be connected to an external circuit. For example, in the embodiments illustrated in FIG. 5, the switch point 320c is connected to the three inter-switch links 330a, 330d and 331c, and is further connected to an external circuit through an inter-circuit link 530.

The inter-circuit link 530 may be a bidirectional link or a unidirectional link. A bi-directional inter-circuit link 530 may include a pair of uni-directional wires having opposite communication directions and/or one bi-directional wire.

Furthermore, according to the structure of the semiconductor device 500, the inter-circuit link 530 may include parallel communication lines including a plurality of wires, or may include a serial communication line including one wire. In each case, the link 530 may be connected to the external circuit through a number of I/O (Input/Output) pads.

As described above, in a mesh-based on-chip bus architecture according to some embodiments of the invention, a single switch point may be mapped to multiple functional block cores. Data communication between functional block cores having a large amount of data traffic therebetween may be performed using a common switch point. Accordingly, the amount of usage of inter-switch links may be reduced, and thus power consumption and/or communication delays between functional block cores may be reduced.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. An on-chip bus comprising:
   a plurality of switch points including first and second switch points;
   a plurality of inter-switch links including at least one inter-switch link coupled between the first switch point and the second switch point and configured to communicate data between the first switch point and the second switch point; and
   a plurality of functional block cores including first and second functional block cores coupled directly to the first switch point and configured to communicate data through the first switch point;
   wherein data transmitted from the first functional block core to the second functional block core passes through the first switch point without traversing any of the plurality of inter-switch links.

2. The on-chip bus of claim 1, further comprising a third functional block core coupled to the second switch point, wherein data transmitted from the first functional block core to the third functional block core passes through the first switch point, the at least one inter-switch link between the first switch point and the second switch point, and the second switch point.

3. The on-chip bus of claim 1, further comprising a plurality of inter-switch links between adjacent ones of the plurality of switch points, wherein the plurality of inter-switch links are arranged in a mesh pattern having a plurality of interconnections, and wherein respective ones of the plurality of switch points are positioned at respective ones of the plurality of interconnections of the inter-switch links.

4. The on-chip bus of claim 2, wherein a data bandwidth between the first and second functional block cores is larger than a data bandwidth between the first and third functional block cores.

5. The on-chip bus of claim 1, wherein the first switch point includes a queue configured to store data received from the first functional block core and at least one queue configured to respectively store data received from the at least one inter-switch link.

6. The on-chip bus of claim 1, wherein the first switch point includes a multiplexer configured to selectively transfer data received from the first functional block core or from the at least one inter-switch link to the second functional block core.

7. The on-chip bus of claim 1, wherein the first switch point includes at least one switch port coupled to the at least one inter-switch link, a first bus interface port directly coupled to a bus interface port of the first functional block core, and a second bus interface port directly coupled to a bus interface port of the second functional block core, wherein each of the first and second bus interface ports includes a respective queue configured to receive and store data from a respective functional block core connected thereto, a multiplexer configured to selectively transfer data to the respective functional block core connected thereto, and a selection logic unit configured to control operations of the multiplexer.

8. The on-chip bus of claim 7, wherein the switch port includes a queue configured to receive and store data from the second switch point, a multiplexer configured to selectively transfer data to the second switch point, and a selection logic unit configured to control operations of the multiplexer.

9. The on-chip bus of claim 8, wherein the queue of the switch port is coupled to the respective multiplexers of the first and second bus interface ports, and the queues of each of the respective bus interface ports are connected to the multiplexer of the switch port.

10. The on-chip bus of claim 9, wherein the queue of the first bus interface port in the first switch point is connected to the multiplexer of the second bus interface port in the first switch point.

11. The on-chip bus of claim 10, wherein the queue of the second bus interface port in the first switch point is connected to the multiplexer of the first bus interface port in the first switch point.

12. A semiconductor device comprising an on-chip bus, the on-chip bus including:
   a plurality of switch points including first and second switch points;
   a plurality of inter-switch links including at least one inter-switch link coupled between the first switch point and the second switch point and configured to communicate data between the first switch point and the second switch point; and
   a plurality of functional block cores including first and second functional block cores coupled directly to the first switch point and configured to communicate data through the first switch point;
   wherein data transmitted from the first functional block core to the second functional block core passes through the first switch point without traversing any of the plurality of inter-switch links.

13. The semiconductor device of claim 12, further comprising a third functional block core coupled to the second switch point, wherein data transmitted from the first functional block core to the third functional block core passes through the first switch point, the at least one inter-switch link between the first switch point and the second switch point, and the second switch point.

14. The semiconductor device of claim 12, further comprising a plurality of inter-switch links between adjacent ones of the plurality of switch points, wherein the plurality of inter-switch links are arranged in a mesh pattern having a plurality of interconnections, and wherein respective ones of the plurality of switch points are positioned at respective ones of the plurality of interconnections of the inter-switch links.

15. The semiconductor device of claim 13, wherein a data bandwidth between the first and second functional block cores is larger than a data bandwidth between the first and third functional block cores.

16. The semiconductor device of claim 12, wherein the first switch point includes a queue configured to store data received from the first functional block core and at least one queue configured to respectively store data received from the at least one inter-switch link.

17. The semiconductor device of claim 12, wherein the first switch point includes a multiplexer configured to selectively transfer data received from the first functional block core or from the at least one inter-switch link to the second functional block core.

18. The semiconductor device of claim 12, wherein the first switch point includes at least one switch port coupled to the at least one inter-switch link, a first bus interface port directly coupled to a bus interface port of the first functional block core, and a second bus interface port directly coupled to a bus interface port of the second functional block core, wherein each of the first and second bus interface ports includes a respective queue configured to receive and store data from a respective functional block core connected thereto, a multiplexer configured to selectively transfer data to the respective functional block core connected thereto, and a selection logic unit configured to control operations of the multiplexer.

19. The semiconductor device of claim 18, wherein the switch port includes a queue configured to receive and store data from the second switch point, a multiplexer configured to selectively transfer data to the second switch point, and a selection logic unit configured to control operations of the multiplexer.

20. The semiconductor device of claim 19, wherein the queue of the switch port is coupled to the respective multiplexers of the first and second bus interface ports, and the queues of each of the respective bus interface ports are connected to the multiplexer of the switch port.

21. The semiconductor device of claim 20, wherein the queue of the first bus interface port in the first switch point is connected to the multiplexer of the second bus interface port in the first switch point.

22. The semiconductor device of claim 21, wherein the queue of the second bus interface port in the first switch point is connected to the multiplexer of the first bus interface port in the first switch point.

23. The semiconductor device of claim 12, wherein at least one of the switch points is coupled to an external circuit.

24. The semiconductor device of claim 12, wherein the first functional block core includes a microprocessor, a digital signal processor, an FPGA (Field-Programmable Gate Array) block, a mixed signal processor, an I/O (Input/Output) controller and/or a memory block.

25. A method for communicating data on an on-chip bus, the method comprising:
   receiving data from a source functional block core at a first switch point coupled to the source functional block core;
   determining whether or not a destination functional block core is directly coupled to the first switch point;
   sending the data to the destination functional block core through the first switch point when the destination functional block core is directly coupled to the first switch point; and
   sending the data to the destination functional block core through at least one inter-switch link and at least one second switch point arranged between the first switch point and the destination functional block core when the destination functional block core is not directly coupled to the switch point.

26. The method of claim 25, wherein the data received from the source functional block core is queued at the first switch point.

* * * * *